United States Patent [19]

Spang, III et al.

[11] 4,249,238

[45] Feb. 3, 1981

[54] APPARATUS FOR SENSOR FAILURE DETECTION AND CORRECTION IN A GAS TURBINE ENGINE CONTROL SYSTEM

[75] Inventors: Henry A. Spang, III, Schenectady, N.Y.; Robert P. Wanger, Fairfield, Ohio

[73] Assignee: The United States of America as represented by the Administrator of the National Aeronautics and Space Administration, Washington, D.C.

[21] Appl. No.: 909,235

[22] Filed: May 24, 1978

Related U.S. Application Data

[63] Continuation-in-part of Ser. No. 752,050, Dec. 20, 1976, abandoned.

[51] Int. Cl.³ .................. G05B 17/02; F02C 9/00
[52] U.S. Cl. .................... 364/106; 60/39.24; 364/431
[58] Field of Search ............ 364/105, 106, 431, 492; 73/117.3, 117.4; 60/39.24, 39.25, 39.26, 39.27, 39.28

[56] References Cited

U.S. PATENT DOCUMENTS

| | | | |
|---|---|---|---|
| 3,721,120 | 3/1973 | Howell et al. | 73/117.3 |
| 3,736,796 | 6/1973 | Hohenberg | 73/117.3 |
| 3,834,361 | 9/1974 | Keely | 60/39.28 R |
| 3,891,915 | 6/1975 | Yannone et al. | 60/39.27 |
| 3,971,208 | 7/1976 | Schwent | 60/39.27 X |
| 4,033,112 | 7/1977 | Schuster | 60/39.28 R |
| 4,054,780 | 10/1977 | Bartley et al. | 364/106 |
| 4,058,975 | 11/1977 | Gilbert et al. | 60/39.28 R |

FOREIGN PATENT DOCUMENTS

| | | | |
|---|---|---|---|
| 2436738 | 2/1975 | Fed. Rep. of Germany | 60/39.28 R |
| 1433612 | 4/1976 | United Kingdom | 364/492 |
| 447689 | 10/1974 | U.S.S.R. | 364/106 |

OTHER PUBLICATIONS

Montgomery et al.: A Self-Reorganizing Digital Flight Control System for Aircraft, A1AA-12th Aerospace Sciences Meeting, Washington, D.C. 1-30 to 2-1, 1974, pp. 1-13.

*Primary Examiner*—Felix D. Gruber
*Attorney, Agent, or Firm*—Carl L. Silverman; Derek P. Lawrence; Norman T. Musial

[57] ABSTRACT

An improved gas turbine engine control system maintains a selected level of engine performance despite the failure or abnormal operation of one or more engine parameter sensors. The control system employs a continuously updated engine model which simulates engine performance and generates signals representing real time estimates of the engine parameter sensor signals. The estimate signals are transmitted to a control computational unit which utilizes them in lieu of the actual engine parameter sensor signals to control the operation of the engine. The estimate signals are also compared with the corresponding actual engine parameter sensor signals and the resulting difference signals are utilized to update the engine model. If a particular difference signal exceeds specific tolerance limits, the difference signal is inhibited from updating the model and a sensor failure indication is provided to the engine operator.

14 Claims, 2 Drawing Figures

APPARATUS FOR SENSOR FAILURE DETECTION AND CORRECTION IN A GAS TURBINE ENGINE CONTROL SYSTEM

The invention herein described was reduced to practice in the performance or work under a NASA contract and is subject to the provisions of Section 305 of the National Aeronautics and Space Act of 1958, Public Law 85-508 (72 Stat. 435, 42 U.S.C. 2457).

CROSS REFERENCE TO RELATED APPLICATION

This is a continuation-in-part of Ser. No. 752,050, filed Dec. 20, 1976, now abandoned.

BACKGROUND OF THE INVENTION

1. Field of the Invention

This invention relates to gas turbine engine control systems and more particularly to an apparatus in a gas turbine control system for detecting the failure of an engine parameter sensor and taking corrective action.

2. Description of the Prior Art

Gas turbine engine control systems, particularly for use in controlling aircraft engines, generally include a number of sensors which measure various engine parameters. These sensors measure performance parameters, typically gas generator and fan rotational velocities and engine operating pressures and temperatures as well as controlled parameters, typically fuel flow and variable geometry positions. The signals developed by such sensors are used to control actuators such as of the electrohydraulic and electromechanical type which vary the position of the controlled parameters, to control the operation of the engine. In a conventional engine control system the engine parameter sensors are connected directly to a control computational unit within the engine control system. The control computational unit may be analog in which dedicated circuits perform continuous computations or it may be digital in which computations are performed sequentially on a time-sharing basis. In either case, the control computational unit using directly the sensed values for both the engine performance parameters and the controlled parameters and known engine behavior characteristics computes signals to modify the controlled parameters in order to maintain a selected level of engine performance. The signals from the control computation unit are amplified, conditioned and then transmitted to the actuators which alter the controlled parameters.

One potential problem associated with such prior art control systems is that the loss of a signal representative of the true value of the parameter from one or more engine performance parameter sensors or controlled parameter sensors may cause a loss of control of one or more of the controlled parameters resulting in a loss of control of engine performance. Such a signal loss may be due to any number of factors including the failure or malfunctioning of the sensor itself, the failure or malfunctioning of the interconnection between the sensor and the control computational unit or the failure of malfunctioning of any of the processing circuitry for the sensor signals. All such failures, abnormal operations, malfunctions, etc. sometimes are referred to herein as failure or failures.

Accordingly, it is the primary object of this invention to provide a control system for a gas turbine engine which prevents loss of control of engine performance in the event of the loss of a true signal from an engine parameter sensor.

It is a further object of this invention to provide such a control system which transmits an indication to the engine operator when the failure or malfunctioning of an engine parameter sensor or its associated circuitry has occurred.

SUMMARY OF THE INVENTION

These and other objects, which will hereinafter become apparent, are accomplished by the improved control system of the present invention which includes means for sensing actual engine performance and controlled parameters, control computational means, actuator means and further includes failure indication and corrective action means for receiving signals from the sensor means and from the control computational means and for generating signals representing real time estimates of the engine performance parameters and the controlled parameters while the engine is in operation. The estimate signals are transmitted to the control computational means in lieu of the actual engine performance and controlled parameter sensor signals. The control computational means utilizes the received estimate signals to generate control signals which are transmitted to the actuator means to modify the engine controlled parameters. The control system thus maintains a selected level of engine performance despite the failure or abnormal operation of one or more engine parameter sensors or associated circuitry.

In a more specific form of the present invention, the improved control system employs a continuously updated engine model to simulate engine performance and to generate signals which represent estimates of the various engine parameters for the particular engine operation. The model is comprised of control system logic hardware whose performance is analogous to a set of mathematical equations which define the interrelationships between the various engine performance parameters, typically rotational velocities, pressures and temperatures of the various components, as a function of the various controlled parameters, typically fuel flow and geometry. The model generated estimate signals are compared with the corresponding actual engine parameter sensor signals and difference signals are produced. As long as the difference signals are within specific tolerance limits, they are utilized to update the model. If one or more of the difference signals exceeds the tolerance limits, the particular signal or signals are inhibited from updating the model and a sensor failure indication may be provided to the engine operator. The model is then updated by the remaining uninhibited difference signals.

DESCRIPTION OF THE PREFERRED EMBODIMENT

Figure 1:
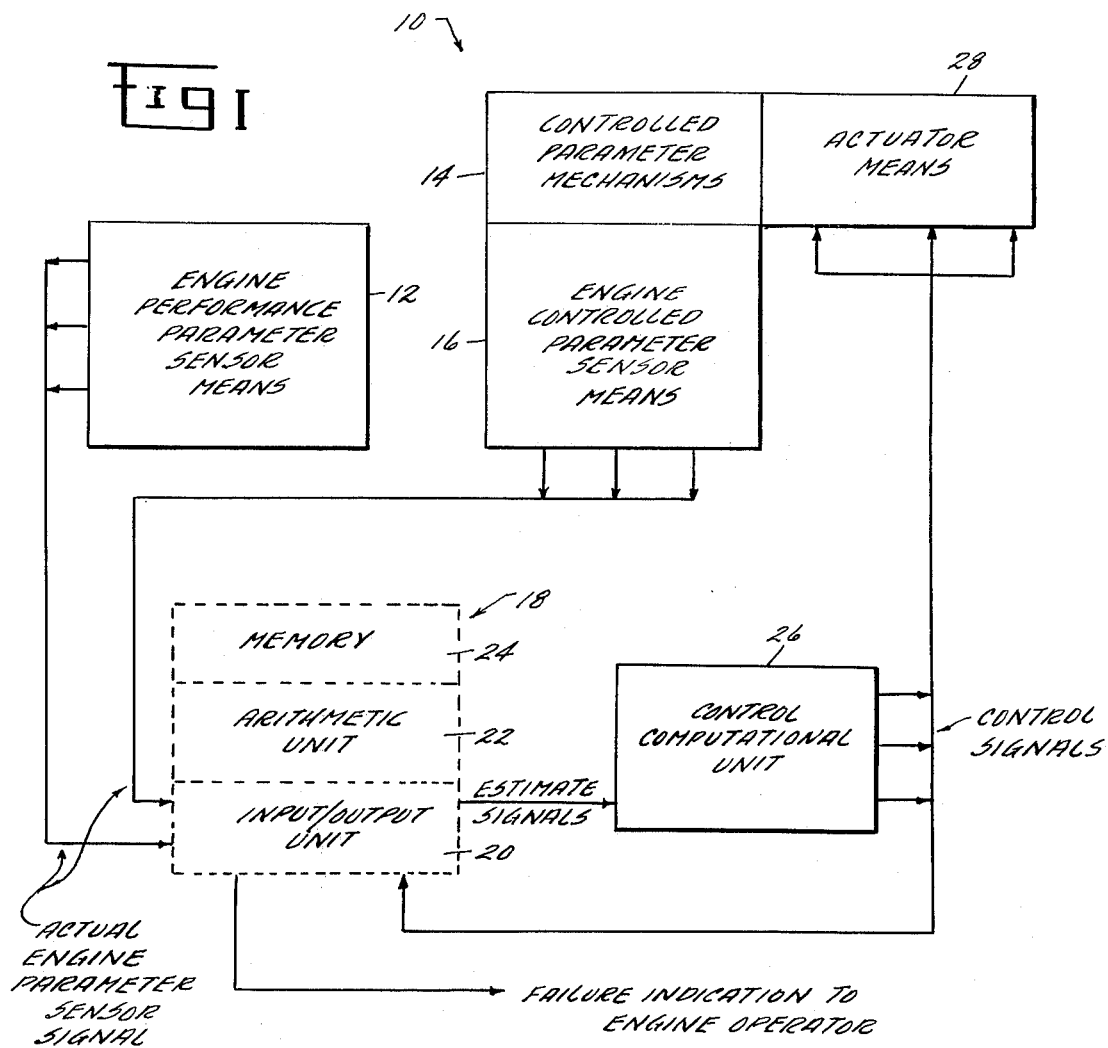
FIG. 1 is a schematic block diagram of the preferred embodiment of the improved control system of the present invention.

Referring to FIG. 1, there is shown a block diagram of a control system shown generally at 10 for a gas turbine engine. Shown in dashed lines in FIG. 1 is one form of the failure indication and corrective action means of the improved control system of the present invention. The gas turbine engine may be of any type known in the art, for example including a turbojet, turboprop, turboshaft or turbofan, and a detailed description of its operation is not necessary for purposes of describing the present invention.

The control system 10 includes engine performance parameter sensor means 12, such as a plurality of sensors for measuring the actual values of the engine performance parameters. The performance parameters include the pressures and temperatures of various engine components as well as velocities of various parts of the engine. The sensed performance parameter values are utilized by the control system 10 to control various engine controlled mechanisms 14, typically fuel flow and engine geometry, in order to maintain a selected level of engine performance.

In a typical prior art gas turbine engine control system, such as the one shown in solid lines in FIG. 1, signals from both the engine performance parameter sensors 12 and controlled parameter sensor means 16 are transmitted to a control computational means or unit 26. The control computational unit 26, which may be of the analog or digital type, utilizes the sensor signals to generate control signals which are transmitted to actuator means 28 such as of the electromechanical and electrohydraulic type. The actuators in turn operate to modify the controlled mechanisms in order to maintain a selected level of engine performance.

Although, under normal operating conditions, such a control system is adequate for controlling a gas turbine engine, the failure or malfunctioning of an engine parameter sensor or its associated transmitting or receiving circuitry could result in a loss of control of one or more controlled parameters and a corresponding degradation in engine performance.

The present invention, in one form, operates to overcome the effects of sensor failure or malfunction by interposing a digital computer shown generally, in dashed lines, as 18 between the output of the engine parameter sensors 12 and 16 and the control computational unit 26. The digital computer 18 includes an input/output unit 20 for external interface, an arithmetic unit 22 for performing arithmetic calculations and a memory 24 for storing programs and data. The computer hardware may be of a type well known in the art and comprises a machine having a cycle time which is fast enough to provide real time operation.

Output signals from the engine parameter sensor means 12 and 16 are transmitted to the computer input/output unit 20 in lieu of being sent directly to the control computational unit 26. Depending upon the type of sensors and digital computer being employed, it may be necessary to employ signal processing amplifiers and analog to digital converters (neither of which are shown) in order to condition the sensor output signals to be compatible with the input requirements of the digital computer. Such amplifiers and converters may be co-located with or form a part of either the sensors or the computer input/output unit 20 or may be individually located at a convenient place therebetween. The amplifiers and converters may be of any suitable type well known in the art and a detailed description of their operation is not necessary for purposes of describing the present invention.

The computer memory 24 comprises known hardware which includes an engine model program which simulates the performance of the gas turbine engine. The model is comprised of a set of mathematical equations which define the interrelationships between the various engine performance parameters as a function of the various engine controlled parameters. The equations utilized to construct the model of this particular embodiment of the invention are shown below. It was necessary to introduce a number of constants (K1-K67) for purposes of scaling, unit correction and to achieve the best possible mathematical fit for certain non-linear functions.

$$W2 = K1 \left( \frac{P1}{\sqrt{T1}} \right) \left[ \left( \frac{NL}{\sqrt{T1}} \right) - K2 \left( \frac{P15}{P1} \right) + K3 \right] \tag{1}$$

wherein:
W2 = fan airflow
P1 = fan inlet pressure
T1 = fan inlet temperature
NL = low pressure rotor RPM
P15 = fan discharge pressure
K1, K2, K3 = constants $$T15 = K4 T1 \left[ \left( \frac{NL}{\sqrt{T1}} \right) + K5 \left( \frac{P15}{P1} \right) + K6 \right] \tag{2}$$

wherein:
T15 = fan discharge temperature
K4, K5, K6 = constants $$T21 = K7 T15 - K8 T1 \tag{3}$$

wherein:
T21 = core inlet temperature
K7, K8 = constants $$P21 = P15 \quad \text{if} \frac{NH}{\sqrt{T21}} \leq K9 \tag{4}$$

$$P21 = K10 \left\{ P15 \left[ \left( K11 \frac{NL}{\sqrt{T1}} + K12 \right) \frac{NL}{\sqrt{T1}} + K12 \right] \right\}$$
$$\text{if} \frac{NH}{\sqrt{T21}} > K13$$

wherein:
P21 = core inlet pressure
NH = high pressure rotor RPM
K9, K10, K11, K12, K13 = constants
K9 = K13

$$W21 = K14 \frac{P21}{\sqrt{T21}} \left( \frac{NH}{\sqrt{T21}} - K15 \frac{P3}{P21} - K16 \right) (1 - fZ\beta) \tag{5}$$

wherein:
W21 = compressor inlet airflow
P3 = compressor discharge pressure
fZβ = deviation of stator position from design schedule
K14, K15, K16 = constants $$T3 = T21 \left( K17 \frac{P3}{P21} - K18 \frac{NH}{\sqrt{T21}} + K19 \right) \tag{6}$$

wherein:
T3 = compressor discharge temperature
K17, K18, K19 = constants $$W3 = W20 \, W21 \quad (7)$$

wherein:
W3 = combustor inlet airflow
K20 = constant $$T4 = K21 \, T3 + \left[\left(K22 \frac{Wf}{W3} + K23\right) \frac{Wf}{W3}\right] + K24 \quad (8)$$

wherein:
T4 = combustor discharge temperature
Wf = fuel flow
K21, K22, K23, K24 = constants $$W4 = W3 + Wf \quad (9)$$

wherein:
W4 = combustor discharge gas flow $$P4 = \frac{K25 \, W4}{\sqrt{T4}} \quad (10)$$

wherein:
P4 = high pressure turbine inlet pressure
K25 = constant $$P3 = K26 \, P4 \quad (11)$$

wherein:
P3 = compressor discharge pressure
K26 = constant $$Wf = K27 \, (ZWf + K28)(ZWf + K29) \quad (12)$$

wherein:
Wf = fuel flow
ZWf = fuel valve position
K27, K28, K29 = constants $$W15 = W2 - W21 \quad (13)$$

wherein:
W15 = bypass duct airflow $$PS56 = P15 - \left[K30 \frac{W15^2 T15}{P15} + K31\right] \frac{W15^2 T15}{P15} \quad (14)$$

wherein:
PS56 = static pressure at turbine discharge
K30, K31 = constants $$W56 = W21 + Wf \quad (15)$$

wherein:
W56 = turbine discharge gas flow $$P56 = PS56 + \frac{K32 \, W56^2 \, T56}{PS56} \quad (16)$$

wherein:
P56 = total pressure at turbine discharge
K32 = constant $$P42 = K33 \, P56 \left[\left(\frac{P4}{P56} + K34\right) \frac{P4}{P56} + K35\right] \text{ if } \frac{P4}{P56} < K36 \quad (17)$$

$$P42 = K37 \, P56 \left[\left(K38 \frac{P4}{P56} + K39\right) \frac{P4}{P56} + K40\right]$$

$$\text{if } \frac{P4}{P56} \geq K41$$

wherein:
P42 = turbine interstage pressure
K33 to K41 = constants
K36 = K41

$$T42 = T4 \left(K42 \frac{P42}{P4} + K43\right) \quad (18)$$

wherein:
T42 = turbine interstage temperature
K42, K43 = constants $$T56 = T42 \left[\left(K44 \frac{P56}{P42} + K45\right) \frac{P56}{P42} + K46\right] \quad (19)$$

wherein:
T56 = low pressure turbine discharge temperature
K44, K45, K46 = constants $$W8 = W2 + Wf \quad (20)$$

wherein:
W8 = gas flow leaving mixer
W2 = fan airflow
Wf = fuel flow $$T8 = \frac{W56 \, (K47 \, T56 + K48) + W15 \, (K49 \, T15)}{W8} \quad (21)$$

wherein:
T8 = mixer discharge temperature
K47, K48, K49 = constants $$P8 = \frac{K50 \, W8^2 \, T8}{PAMB \, A8^2} + K51 \, PAMB \quad (22)$$

wherein:
P8 = nozzle pressure
PAMB = ambient static pressure
A8 = nozzle effective area
K50, K51 = constants $$PS56X = K52 \, P8 - \frac{K53 \, W8^2 \, T8}{P8} \quad (23)$$

wherein:
PS56X = mixer inlet static pressure
K52, K53 = constants $$PW1 = K54 \, T1 \, W2 \left(\frac{P15}{P1} - K55\right) \quad (24)$$

wherein:
PW1 = power to fan
K54, K55 = constants $$PW25 = K56 \, W21 \, (T3 - T21) \quad (25)$$

wherein:
PW25 = power to compressor
K56 = constant $$PW4 = \left(K57\frac{Wf}{W3} + K58\right) W3T4^2 \left[\frac{(P4 + K59)}{P42} + K60\right] \quad (26)$$

wherein:
PW4=power from high pressure turbine
K57, K58, K59, K60=constants $$PW48 = \left(K61\frac{Wf}{W3} + K62\right) W3T42 \left[\frac{(P42/P56 + K63)P42}{P56} - K64\right] \quad (27)$$

wherein:
PW48=power from low pressure turbine
K61, K62, K63, K64=constants $$\frac{dNL}{dt} = \frac{K65(PW48 - PW1 + K66)}{NL} \quad (28)$$

wherein:
(dNL/dt)=rate of change of low pressure rotor RPM
K65, K66=constants $$\frac{dNH}{dt} = \frac{K67(PW4 - PW25)}{NH} \quad (29)$$

wherein:
(dNH/dt)=rate of change of high pressure rotor RPM
K67=constant

In addition to the above-described exemplary equations, a section of the computer memory 24 is provided with stored data items from sensor means 12 and 16 which represent the current, real time internal status of the engine. As will be discussed below, these stored data items are retrieved and processed to develop estimate signals which correspond to the appropriate actual engine performance and actual engine controlled parameters. After an initial start-up period during which values for both the engine performance parameters and the engine controlled parameters are preset into the engine model, the model continuously receives signals from the engine parameter sensors in means 12 and 16 as well as the control signals from the control computational unit 26. The engine model utilizes these signals in conjunction with the mathematical equations and the data items to calculate signals representing estimates of the engine parameters sensor signals. The estimate signals thus provided are then transmitted to the control computational unit 26 in lieu of the actual engine parameter sensor signals. The control computational unit 26 utilizes the estimate signals to generate control signals which are transmitted to the actuators 28.

A computer printout representative of a fortran language computer program which implements the engine model is shown below. The right hand marginal notations indicate the portions of the program in which the above-identified equations are actually implemented. Some of the equations are identified as being implemented in several places within the program due to the use of iterative calculations and subcalculations and in some cases, the subcalculations are identified as being utilized in several equations as indicated.

```
      SUBROUTINE ENGMOD
      SCALED FRACTION WF,ZWF,SQTT1,XNLC,XNL,W2C,P1501,W2,T15,T1,T21,
     $SQTT21,XNHC,XNH,P21,P15,DXNHC,EXNHC,ZBETAC,BETAC,BETA,P3C21,
     $P21,WP21,DB,DUM1,DUM2,DUM3,W21,W21P,MULDIV,W3,T3P,T3,TH3,F4,TP4,
     $T4,TH4,T4P,W4,P4,P3X,P3,P3TOL,W15,FF15,T15,P15,PS56,W56,P56,T56,
     $P4056,P42,T42,T56X,W8,T8,P8,PAMB,AB,PS56X,TOLP56,P15,W25C,DPQ11,
     $PS3,DUM,PW1,T2,P1501,PW25,T21,PW4,P42,PW48,QL,QH,DXNL,DXNH,DTH3,
     $DTH4,W4,DZBETA,XIB,DZWF,XIW,DT3S,T3S,DT25S,T25S,W21,DT12S,T12S,
     $DT56S,T56,T56S,W56,P1,ZBETA,T56TOL
     *,UWF,UBETA
      COMMON/CYCVAR/CV
      SCALED FRACTION CV(370)
      EQUIVALENCE
     $(AB      ,CV(  56)),(BETA    ,CV(  58)),
     $(BETAC   ,CV(  57)),(DPQ11   ,CV(  78)),
     $(DT12S   ,CV(  97)),(DT25S   ,CV(  99)),
     $(DT3S    ,CV(  98)),(DT56S   ,CV( 100)),
     $(DTH3    ,CV(  93)),(DTH4    ,CV(  94)),
     $(DXNL    ,CV(  91)),(DXNH    ,CV(  92)),
     $(DZBETA  ,CV(  96)),(DZWF    ,CV(  95)),
     $(P1      ,CV(  66)),(P15     ,CV(  67)),
     $(P21     ,CV(  68)),(P3      ,CV(  69)),
     $(P3TOL   ,CV(  95)),(P3X     ,CV(  70)),
     $(P4      ,CV(  71)),(P42     ,CV(  72)),
     $(P56     ,CV(  73)),(P8      ,CV(  76)),
     $(PAMB    ,CV(  55)),(PS3     ,CV(  77)),
     $(PS56    ,CV(  74)),(PS56X   ,CV(  75)),
     $(PW1     ,CV(  49)),(PW25    ,CV(  50)),
     $(PW4     ,CV(  51)),(PW48    ,CV(  52)),
     $(QH      ,CV(  22)),(QL      ,CV(  21)),
     $(T1      ,CV(   1)),(T12S    ,CV(  17)),
     $(T15     ,CV(   2)),(T21     ,CV(   3)),
     $(T25S    ,CV(  19)),(T3      ,CV(   4)),
     $(T3S     ,CV(  18)),(T4      ,CV(   5)),
     $(T42     ,CV(   6)),(T5      ,CV(   7)),
     $(T56S    ,CV(  20)),(T56TOL  ,CV(  26)),
     $(T56X    ,CV(   8)),(T8      ,CV(   9)),
     $(UWF     ,CV(  13)),(UBETA   ,CV(  14)),
```

```
      S(TOLP56,CV( 971)),(P15    ,CV( 37)),
      S(W2   ,CV( 331)),(W21    ,CV( 35)),
      S(W2IR ,CV( 341)),(W3     ,CV( 36)),
      S(W4   ,CV( 341)),(WF     ,CV( 55)),
      S(XIR  ,CV( 541)),(XIP    ,CV( 53)),
      S(XNH  ,CV( 121)),(XNL    ,CV( 11)),
      S(ZBETA,CV( 141)),(ZNF    ,CV( 15))
         SCALED FRACTION VPS3,VT56,VP15,SPS3,ST56,SP15,EIPS3,EIT56,EIPS56
         EQUIVALENCE
      S(LSIMP ,CV(1921),
      S(JJKOUT,CV(1931)),(ICNTL ,CV(192))),
      S(VPS3  ,CV(1721)),(VT56  ,CV(173)),
      S(VP15  ,CV(1741)),(SPS3  ,CV(175)),
      S(ST56  ,CV(1761)),(SP15  ,CV(177)),
      S(EIPS3 ,CV(1781)),(EIT56 ,CV(179)),
      S(EIPS56,CV(1801))
         SCALED FRACTION XIWL,XIBL,TIW,TIB,XIWLD,XIBLD
         EQUIVALENCE
      S(XIWL  ,CV(345)),(XIBL   ,CV(366)),
      S(TIW   ,CV(347)),(TIB    ,CV(368)),
      S(XIWLD ,CV(349)),(XIBLD  ,CV(370))
         WF=((ZWF+.86453S)*(ZWF+.36453S))/.56138S ----------(12)
         SQTT1=SSQRT(T1)
         PS3=PS3+SPS3 ---------------------------------(11)
         T56=T56+ST56 ---------------------------------(19)
         P15=P15+SP15 ---------------------------------(1)
  100 CONTINUE
         PS3=PS3+VPS3 ---------------------------------(11,19)
         T56=T56+VT56 ---------------------------------(19)
         P15=P15+VP15 ---------------------------------(1)
         P3=PS3/.94697S
  180 PISQ1=(.5S*P1)/P1 --------------------------------(1,2)
         XNLC=(.44194S*XNL)/SQTT1 -----------------------(1,2,4)
         W2C=XNLC/.941A4S-.88557S*PISQ1+.40061S ---------(1)
         W2=W2C*P1/SQTT1/.56568S ------------------------(1)
         T15=(T1*(-.0339S*XNLC+.43365S*PISQ1+.29186S))/.5S --(2)
         T21=T15/.75758S-.32S*T1 ------------------------(3)
         SQTT21=SSQRT(T21)
         XNHC=(.50504S*XNH)/SQTT21 ---------------------(4,5,6)
         P21=P15 ---------------------------------------(4)
         IF(XNHC.GT..99143S)P21=(P15*((-.2033AS*XNLC+.26784S) ---(4)
       S*XNLC+.43286S))/.5S
         DXNHC=XNHC-.58063S
         IF(DXNHC)244,234,234
  234 EXNHC=XNHC-.7339S
         IF(EXNHC)242,238,238
  238 ZBETAC=((EXNHC-.38286S)*EXNHC)/.1283S+.19235S
         GO TO 264
  242 ZBETAC=((-DXNHC-.09488S)*DXNHC)/.10331S+.5263S
         GO TO 264
  246 DXNHC=XNHC-.49554S
         IF(DXNHC)254,250,254
  250 ZBETAC=((DXNHC-.2398S)*DXNHC)/.13515S+.6272S
         GO TO 264
  254 DXNHC=XNHC-.38263S
         IF(DXNHC)262,258,258
  258 ZBETAC=((-DXNHC-.09A5S)*DXNHC)/.32441S+.69555S
         GO TO 264
  262 ZBETAC=(.72A39S*DXNHC-.28121S)*DXNHC+.69757S
  264 ZBETAC=SMAX(P.0S,SMIN(.74752S,ZBETAC))
         BETAC=((-.3578AS*ZBETAC+.99999S)*ZBETAC)/.68231S-.962S
         BETA=((-.17453S*ZBETA+.5S)*ZBETA)/.34116S-.942S
  285 P3Q21=(.4S*P3)/P21 -----------------------------(5,6)
         W21=P21*(XNHC-.11399S*P3Q21+.5219AS)/SQTT21/.25214S ---(5)
         DB=BETA-BETAC
         DUM1=(.4333AS*XNHC+.99999S)*XNHC
         DUM2=DB*(.873A9S*XNHC+.13678S)+((-DB-.03A6AS)*DB+.42141S)
         DUM3=.94289S*DUM1+.53385S*DUM2+.49712S
         W21=W21P=W21P+MULDIV(DB,DUM3,.A5S) --------------(5)
         W3=.9593S*W21 -----------------------------------(7)
         T3=(T21+(.5A64S*P3Q21-.05432S*XNHC+.57628S))/.4S ---(6)
```

In addition to the above-described model, in one form of the present invention the computer memory 24 includes a logic program for both model updating and failure detection and indication.

Figure 2:
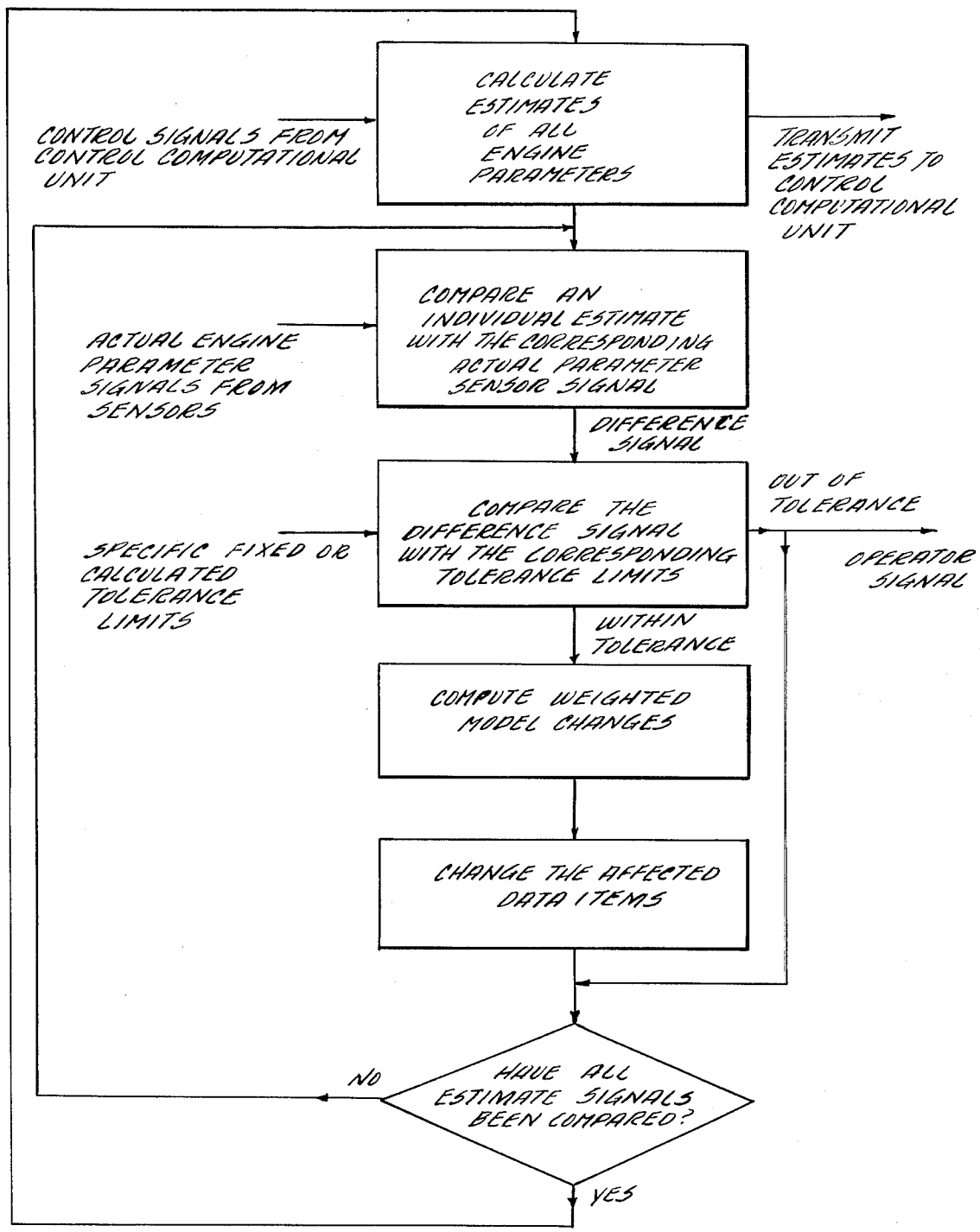
FIG. 2 is an operational flow diagram of a portion of the control system of FIG. 1.

Referring now to the operational flow diagram of FIG. 2, model updating is accomplished by first comparing each calculated engine parameter estimate signal with the corresponding actual engine parameter sensor signal. Each resulting difference signal is then utilized to update the engine model by changing all of the stored data items which are affected by the engine parameter which corresponds to the difference signal. In order to provide improved accuracy, the magnitude of the change produced by a particular difference signal to each stored data item is weighted so as to be proportional to the degree of control that the engine parameter corresponding to the difference signal has over the particular data item as compared with the degree of control that the other engine parameters have over that data item.

In order to determine whether a particular engine parameter sensor in means 12 and 16 or its associated transmission and interconnection circuitry is functioning properly, each difference signal is compared with a set of specific tolerance limits. The tolerance limits may be predetermined stored values or may be continuously calculated as a function of current engine operational characteristics. If a particular difference signal exceeds the tolerance limits either by being greater than an upper limit or by being less than a lower limit, then the corresponding engine parameter signal being received by computer input/output unit 20 is deemed to be improper. Such an improper signal may be the result of a number of possible occurrences including a complete or partial failure of the particular sensor, a complete or partial failure of the signal processing circuitry associated with the particular sensor, or a complete or partial failure of the interconnecting circuitry between the particular sensor and the computer input/output unit 20. For those difference signals which exceed the tolerance limits, corrective action is taken to insure that a significant degradation of engine performance does not occur. Such corrective action includes immediately inhibiting the out-of-tolerance difference signals from being utilized to update the engine model. The model is updated, however, by the remaining uninhibited difference signals as described above and continues to generate estimate signals for all of the engine parameters.

It should be noted that although a particular difference signal has been inhibited from updating the engine model, the engine parameter sensor from which the difference signal was derived, has not been inhibited and continues to provide a signal to the computer input/output unit 20. Thus, if an improper sensor signal resulted from a transient or some other temporary condition and a proper signal is subsequently received, the difference signal associated with the particular sensor is no longer inhibited and is again utilized to update the engine model.

In addition to inhibiting an out-of-tolerance difference signal from updating the model, an indication that a particular engine performance parameter sensor is providing an improper signal may be provided to the engine operator. Such an indication may take the form of a light or any other suitable indicator (not shown) which is known in the art.

A computer printout representative of a fortran language computer program which implements the above-discussed logic program is shown below.

```
SUBRL.TINE MODELL
COMMON/CYCVAR/CV
COMMON/LINES/SLINER(7),SLINEL(7),CLINER(7),CLINEL(7)
LOGICAL SLINER,SLINEL,CLINER,CLINEL,USEOTW,USEOTZ
INTEGER AND
LOGICAL IFICA1,IFICA2
SCALED FRACTION CV(370)
SCALED FRACTION E(11),K(10,11),TEST(11),YM(11),X(10),YC(11)
SCALED FRACTION SF(10)
SCALED FRACTION TH3OTW,TH4OTW,ETH3,ETH4
SCALED FRACTION
SP1OTW,PAMBOT,T1OTW,XNLOTW,XNHOTW,ZWFOTW,ZBETOT,EPS3,EPS56,EDPQP,
SET25,ET56,ET3,ET12,EXNL,EXNH,EZWF,EZBETA,OT,OXNLO,XNLO,XNLOO,XNLP
SOXNHO,XNHO,XNHOO,XNHP,DTH30,TH30,TH30O,TH3P,DTH40,TH40,TH40O,TH4P
SOZBETO,ZBETAO,ZBETOO,ZBETAP,OZWFO,ZWFO,ZWFOO,ZWFP,DT3SO,T3SO,T3SO
S,T3SP,DT25SO,T25SO,T25SOO,T25SP,DT12SO,T12SO,T12SOO,T12SP,DT56SO,
ST56SO,T56SOO,T56SP
S,PS3OTW,PS56OT,DPQOTW,T25OTW,T56OTW,T3OTW
S,A8,BETA,BETAC,DPQ11,DT12S,DT25S,DT3S,DT56S,DTH3,DTH4,DXNL,DXNH,
SDZBETA,OZWF,P1,P15,P21,P3,P3TOL,P3X,P4,P42,P56,P8,PAMB,PS3,PS56,
SPS56X,PW1,PW25,PW4,PW48,QH,QL,T1,T12S,T15,T21,T25S,T3,T3S,T4,T42,
ST56,T56S,T56TOL,T56X,T8,TH3,TH4,TOLP56,W15,W2,W21,W21P,W3,W8,WF,
SXIB,XIW,XNH,XNL,ZBETA,ZWF,ET12,XNLC,XNHC,T3SC,ZWFC,ZBETAC,
SDPQ11C,PS56C,T56SC,T12SC,XNLP,XNHP,TH3P,TH4P,ZBETAP,ZWFP,T3SP,
ST25SP,T12SP,T56P,T25SC,PS3C
S,UWF,UBETA
S,T3RT,T56RT
S,XNLD,XNHO,ZWFD,ZBETAO,T3SD,T56SD
   SCALED FRACTION TIME
   SCALED FRACTION SQTT1
   SCALED FRACTION VPS3,VT56,VP15,SPS3,ST56,SP15,EIPS3,EIT56,EIPS56
   SCALED FRACTION XNHCSW
   EQUIVALENCE
S(A8       ,CV( 56)),(BETA    ,CV( 58)),
S(BETAC    ,CV( 57)),(DPQ11   ,CV( 78)),
S(DT12S    ,CV( 97)),(DT25S   ,CV( 99)),
S(DT3S     ,CV( 98)),(DT56S   ,CV(100)),
S(DXNL     ,CV( 91)),(DXNH    ,CV( 92)),
S(DTH3     ,CV( 93)),(DTH4    ,CV( 94)),
S(DZBETA   ,CV( 96)),(DZWF    ,CV( 95)),
S(P1       ,CV( 66)),(P15     ,CV( 67)),
S(P21      ,CV( 68)),(P3      ,CV( 69)),
S(P3TOL    ,CV( 25)),(P3X     ,CV( 70)),
S(P4       ,CV( 71)),(P42     ,CV( 72)),
S(P56      ,CV( 73)),(P8      ,CV( 76)),
S(PAMB     ,CV( 65)),(PS3     ,CV( 77)),
S(PS56     ,CV( 74)),(PS56X   ,CV( 75)),
S(PW1      ,CV( 49)),(PW25    ,CV( 50)),
S(PW4      ,CV( 51)),(PW48    ,CV( 52)),
S(QH       ,CV( 22)),(QL      ,CV( 21)),
S(T1       ,CV(  1)),(T12S    ,CV( 17)),
S(T15      ,CV(  2)),(T21     ,CV(  3)),
S(T25S     ,CV( 19)),(T3      ,CV(  4)),
S(T3S      ,CV( 18)),(T4      ,CV(  5)),
S(T42      ,CV(  6)),(T56     ,CV(  7)),
S(T56S     ,CV( 20)),(T56TOL  ,CV( 26)),
```

```
       $(T56X  ,CV(  8)),(T6    ,CV(  9)),
       $(UWF   ,CV( 13)),(UBETA ,CV( 14)),
       $(TOLP56,CV( 27)),(W15   ,CV( 37)),
       $(W2    ,CV( 33)),(W21   ,CV( 35)),
       $(W21P  ,CV( 34)),(W3    ,CV( 36)),
       $(W8    ,CV( 38)),(WF    ,CV( 55)),
       $(XIB   ,CV( 54)),(XIW   ,CV( 53)),
       $(XNH   ,CV( 12)),(XNL   ,CV( 11)),
       $(ZBETA ,CV( 16)),(ZWF   ,CV( 15))
        EQUIVALENCE
       $(T3RT  ,CV( 59)),(T56RT ,CV( 60)),
       $(XNHCSW,CV( 23)),
       $(LSIMP ,CV(192)),
       $(IJKOUT,CV(193)),(ICNTL ,CV(194)),
       $(LSYNC ,CV(195)),(MSYNC ,CV(196)),
       $(NSYNC ,CV(197)),(NTRY  ,CV(198)),
       $(MERROR,CV(199)),(KS    ,CV(200))
C      CV(150) TO CV(158) USED BY ITERATION MATRIX
        EQUIVALENCE
       $(VPS3  ,CV(172)),(VT56  ,CV(173)),
       $(VP15  ,CV(174)),(SPS3  ,CV(175)),
       $(ST56  ,CV(176)),(SP15  ,CV(177)),
       $(EIPS3 ,CV(178)),(EIT56 ,CV(179)),
       $(EIPS56,CV(180))
        EQUIVALENCE
       $(XNLOTW,CV(131)),(XNHOTW,CV(132)),
       $(T3OTW ,CV(133)),(ZWFOTW,CV(134)),
       $(ZBETOT,CV(135)),(DPQOTW,CV(136)),
       $(T25OTW,CV(137)),(PS3OTW,CV(138)),
       $(PS56OT,CV(139)),(T56OTW,CV(140)),
       $(T1OTW ,CV(141)),(P1OTW ,CV(142)),
       $(PAMBOT,CV(143)),
       $(EXNL  ,CV(161)),(EXNH  ,CV(162)),
       $(ET3   ,CV(163)),(EZWF  ,CV(164)),
       $(EZBETA,CV(165)),(EDPQP ,CV(166)),
       $(ET25  ,CV(167)),(EPS3  ,CV(168)),
       $(EPS56 ,CV(169)),(ET56  ,CV(170)),
       $(ET12  ,CV(171)),
       $(XNLD  ,CV(323)),(XNHD  ,CV(324)),
       $(ZWFD  ,CV(327)),(ZBETAD,CV(328)),
       $(T3SD  ,CV(330)),(T56SD ,CV(332))
        SCALED FRACTION TXNL,TXNH,TT3,TZWF,TZBETA,TDPQP,TT25,TPS3,TPS56,
       $TT56,TT12
        EQUIVALENCE
       $(TXNL  ,CV(311)),(TXNH  ,CV(312)),
       $(TT3   ,CV(313)),(TZWF  ,CV(314)),
       $(TZBETA,CV(315)),(TDPQP ,CV(316)),
       $(TT25  ,CV(317)),(TPS3  ,CV(318)),
       $(TPS56 ,CV(319)),(TT56  ,CV(320)),
       $(TT12  ,CV(321))
        EQUIVALENCE(E(1),CV(161)),(K(1,1),CV(201)),(TEST(1),CV(311))
        EQUIVALENCE (NPRT  ,CV(159))
        EQUIVALENCE (TIME  ,CV(160))
        EQUIVALENCE(IFICA1,SLINER(4))
        EQUIVALENCE(IFICA2,SLINER(6))
C       READ SENSORS AT THIS POINT
C       SENSORS ARE XNLOTW,XNHOTW,T3OTW,ZWFOTW,ZBETOT,PS3OTW,TS60TW
C       ,P1OTW,PAMBOT,T1OTW
   60   P1=P1OTW
        PAMB=PAMBOT
        T1=T1OTW
C       FICA SW 1  IFICA1
   90   IF(.NOT.IFICA1)GOTO 95
C          XNHCSW  .64541
        IF((.50588S*XNH)/SSQRT(T21).GT.XNHCSW)GOTO 100
   95   NSYNC=0
        LSYNC=0
  100   IF(NSYNC.EQ.0)GOTO 110
C       SUBROUTINE INTEG(XS,DX,DT,XD)
C       X=X+DX*DT
C       SUMMATION IS DOUBLE PRECISION
C       XD IS LEAST SIGNIFICANT PART OF X
C       XS IS MOST SIGNIFICANT PART OF X
        XNL=XNL+
```

```
     $.94968$*(EXNL+.03525$*(EXNH+.84789$*(EPS3+.33456$*(ET56+.27628$
     $WF))))
      CALL INTEG(XNL,DXNL,.01230$,XNLD)
      XNH=XNH+
     $.81992$*(EXNH+.12247$*(EPS3-.20968$*(EXNL-.70276$*(ET3+.13739$*
     $F))))
      CALL INTEG(XNH,DXNH,.01282$,XNHD)
      ZWF=ZWF+
     $.78878$*(EPS3+EPS3+.75286$*(EXNH+.26265$*(EZWF+.80419$*(EXNL-.5
     $9$*(ET3+.66688$*ET56))))
      CALL INTEG(ZWF,DZWF,.04290$,ZWFD)
      ZBETA=ZBETA+
     $.13908$*(EZBETA-.07573$*(EPS3-.12888$*EXNH))
      CALL INTEG(ZBETA,DZBETA,.03123$,ZBETAD)
      IF(AND(MERROR,256).NE.0)GOTO 107
      T3S=T3S+
     $.84268$*(ET3+.19970$*(EXNL+.68998$*(EXNH+.48821$+(ET56+.30296$*
     $3))))
 107 CALL INTEG(T3S,DT3S,.03578$,T3SD)
     IF(AND(MERROR,128).NE.0)GOTO 108
      T56S=T56S+
     $.69538$*(ET56+.23134$*(EXNL+.71578$*(ET3+.33418$*(EXNH+.25393$*
     $3))))
 108 CALL INTEG(T56S,DT56S,.05582$,T56SD)
     GOTO 150
 110 XNL=XNLOTW
     XNH=XNHOTW
     PS3=PS3OTW
     T3S=T3OTW
     ZWF=ZWFOTW
     ZBETA=ZBETOT
     T56S=T560TW
     SQTT1=SSQRT(T1)
     XNLC=(.44194$*XNL)/SQTT1
     P1$=P1*((.54528$*XNLC-.07257$)*XNLC+.81171$)+P1
     T56=T560TW
     SPS3=.0$
     ST56=.0$
     SP15=.0$
     VPS3=.0$
     VT56=.0$
     VP15=.0$
 150 CALL ENGMOD
     EXNL=XNLOTW-XNL
     EXNH=XNHOTW-XNH
     ET3=T30TW-T3S
     EZWF=ZWFOTW-ZWF
     EZBETA=ZBETUT-ZBETA
     EPS3=PS3OTW-P4
     ET56=T560TW-T56S
     MERROR=0
 170 IF(LSYNC)175,180,175
C      FICA SW 2 IFICA2
 175 IF(IFICA2)GOTO 240
C    TXNL=.03752  TXNH=.03413  TT3=.02851  TZWF=.22789  TZBETA=.03738
C    TPS3=.03386  TT56=.02630
 180 IF(SABS(EXNL).GE.TXNL)MERROR=MERROR+2048
     IF(SABS(EXNH).GT.TXNH)MERROR=MERROR+1024
     IF(SABS(ET3).GT.TT3)MERROR=MERROR+256
     IF(SABS(EZWF).GT.TZWF)MERROR=MERROR+32
     IF(SABS(EZBETA).GT.TZBETA)MERROR=MERROR+16
     IF(SABS(EPS3).GT.TPS3)MERROR=MERROR+4
     IF(SABS(ET56).GT.TT56)MERROR=MERROR+128
     NSYNC=NSYNC+1
     IF(MERROR)200,230,200
 200 IF(NSYNC.GE.NTRY)NSYNC=0
     GOTO 530
 230 LSYNC=1
     GOTO 530
 240 IF(SABS(EXNL).LE.TXNL)GOTO 241
     EXNL=.0$
     XNLOTW=XNL
     MERROR=MERROR+2048
```

```
241 IF(SABS(EXNH).LE.TXNH)GOTO 242
    EXNH=.0S
    XNHOTW=XNH
    MERROR=MERROR+1024
242 IF(SABS(ET3).LE.TT3)GOTO 243
    ET3=.0S
    T3OTW=T3S
    MERROR=MERROR+256
243 IF(SABS(EZWF).LE.TZWF)GOTO 244
    EZWF=.0S
    ZWFOTW=ZWF
    MERROR=MERROR+32
244 IF(SABS(EZBETA).LE.TZBETA)GOTO 245
    EZBETA=.0S
    ZBETOT=ZBETA
    MERROR=MERROR+16
245 IF(SABS(EPS3).LE.TPS3)GOTO 246
    EPS3=.0S
    PS3OTW=PS3
    MERROR=MERROR+4
246 IF(SABS(ETS6).LE.TTS6)GOTO 247
    ETS6=.0S
    MERROR=MERROR+128
247 CONTINUE
538 CONTINUE
C   GO TO CONTROL FROM HERE
C   CONTROL USES XNLOTW,XNHOTW,T3OTW,ZWFOTW,ZBETOT,PS3OTW
    RETURN
    END
```

From the foregoing description it can be seen that the present invention provides an improved gas turbine engine control system which maintains engine operation without any significant degradation even though one or more engine parameter sensors are providing improper signals. This represents a significant improvement over prior art control systems in which the loss of a single sensor signal could lead to a drastic reduction in engine performance and perhaps necessitate completely shutting down the engine.

It will be obvious to one skilled in the art that changes can be made to the above-described invention without departing from the broad inventive concepts thereof. For example, although the invention has been illustrated in connection with add-on hardware for use with an existing control system, when used with an existing control system which already employs a digital computer, the invention could be programmed into the existing computer without the addition of separate computer hardware. Also, although illustrated as employing a digital computer 18, the invention may be realized by employing a specialized assembly of analog electronic and/or hydromechanical elements of the type widely applied in the control of gas turbine engines. Alternatively, this invention could be employed in a system in which the sensor signals are transmitted directly to the control computational unit unless an improper signal is detected by the invention, in which case the engine model would supply an estimate signal only for that sensor.

It is to be understood, therefore, that this invention is not limited to the particular embodiment disclosed, but it is intended to cover all modifications which are within the spirit and scope of the invention as claimed.

What is claimed is:

1. An improved gas turbine engine control system including:
   sensor means for sensing actual engine performance parameters and actual engine controlled parameters, control computational means for generating control signals, actuator means for receiving said control signals and for modifying the controlled parameters in order to maintain a selected level of engine performance wherein the improvement comprises: failure indication and corrective action means disposed between said sensor means and said control computational means for receiving signals from said sensor means, for receiving said control signals, and for generating signals representing real time estimates of said actual engine performance parameters and of said actual engine controlled parameters while said engine is in operation, said estimate signals being transmitted to said engine control computational means in lieu of said actual engine performance and actual controlled parameter sensor signals.

2. The control system of claim 1 wherein said failure indication and corrective action means operates as follows:
   performing a simulation of the performance of the gas turbine engine as an engine model including the interrelationships between the engine performance parameters and the engine controlled parameters and generating said estimate signals;
   performing a first comparison by comparing said actual sensor signals with said estimate signals and generating difference signals corresponding to the differences between said compared signals;
   updating said model in response to said difference signals; and
   performing a second comparison by comparing each of said difference signals with tolerance limits and inhibiting said updating from modifying said model in response to difference signals which exceed said tolerance limits.

3. The control system of claim 2 wherein the magnitude of the change to said engine model produced by each difference signal is proportional to the degree of control that the engine parameter corresponding to the difference signal has over said engine model as compared with the degree of control that remaining engine parameters have over said engine model.

4. The control system of claim 3 wherein said tolerance limits are predetermined fixed values.

5. The control system of claim 3 wherein said tolerance limits are calculated.

6. The control system of claim 4 or 5 wherein said second comparison also provides an indication to an engine operator when any of said difference signals exceeds said tolerance limits.

7. The control system of claim 6 wherein said failure detection and corrective action means is comprised of a programmed digital computer.

8. The control system of claim 1 in which at least one of said estimate signals is representative of fuel flow to said engine.

9. The control system of claim 1 in which said engine includes a high pressure rotor and at least one of said estimate signals is representative of the rotational velocity thereof.

10. The control system of claim 1 in which said engine includes a low pressure rotor and at least one of said estimate signals is representative of the rotational velocity thereof.

11. The control system of claim 1 in which said engine includes a compressor and at least one of said estimate signals is representative of the pressure therein.

12. The control system of claim 1 in which at least one of said estimate signals is representative of the temperature of at least one point of said engine.

13. The control system of claim 1 in which said engine includes at least one component therein comprising variable geometry means and wherein at least one of said estimate signals is representative of the position of said variable geometry means.

14. The control system of claim 1 in which said engine includes a fan and wherein at least one of said estimate signals is representative of discharge pressure of said fan.

* * * * *